J. WATSON.
CHURN.

No. 171,331. Patented Dec. 21, 1875.

UNITED STATES PATENT OFFICE.

JAMES WATSON, OF PORT COLBORNE, CANADA.

IMPROVEMENT IN CHURNS.

Specification forming part of Letters Patent No. 171,331, dated December 21, 1875; application filed May 11, 1875.

*To all whom it may concern:*

Be it known that I, JAMES WATSON, of Port Colborne, in the county of Welland and Province of Ontario, Canada, have invented certain new and useful Improvements in Churns; and I do hereby declare that the following is a full, clear, and exact description thereof, which will enable others skilled in the art to which it pertains to make and use the same, reference being had to the accompanying drawing and to the letters of reference marked thereon, which form a part of this specification.

This invention relates to that class of machines known as churns; and consists in certain new and useful constructions and improvements therein, to be hereinafter more fully described by the aid of the accompanying drawings and letters of reference marked thereon, and in which—

Figure 1:
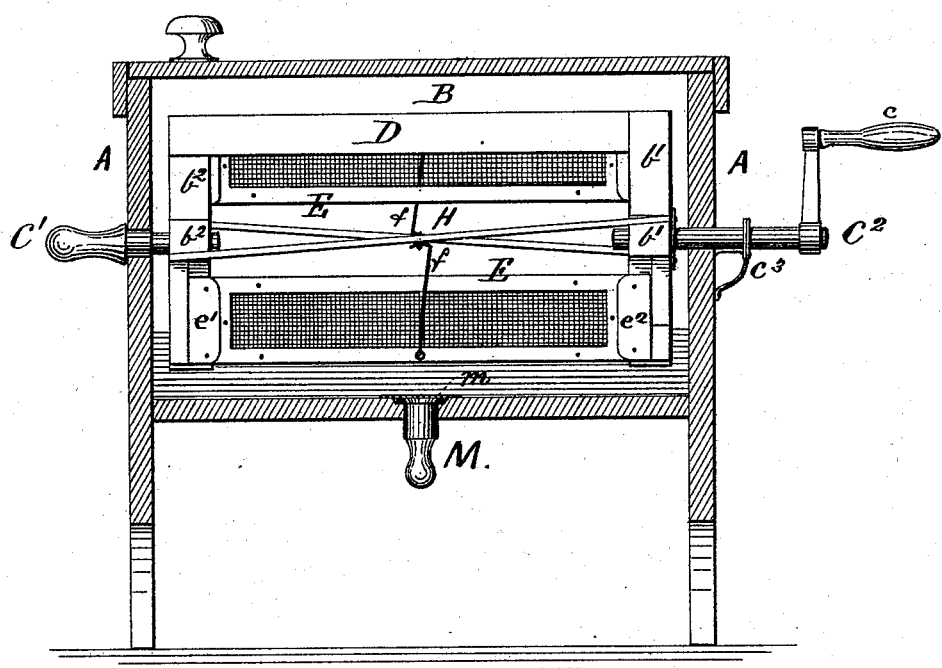
Figure 2:
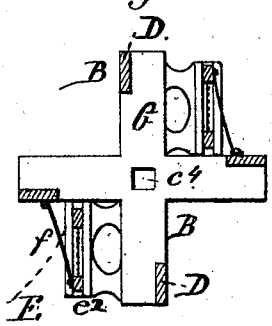
Figure 3:
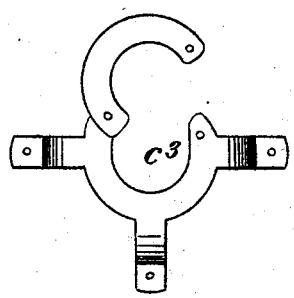

Figure 1 is a side elevation of a churn having my improvement therein. Fig. 2 is a side elevation of my beater.

In all the same letters refer to the same parts.

To construct my improvement, I make in a churn, A, as shown, a peculiar beater, B, which is held in position by two bolts, $C^1$ and $C^2$. The said bolt $C^2$ is also the shaft for propelling the beater, having the handle C on it, and being supported by the bracket $C^3$ at a distance from the side of the churn to give a proper support to the said bolt or shaft $C^2$, the inner end of which is made square, and fits into a corresponding square, $C^4$, in the beater.

Upon withdrawing the said two bolts $C^1$ and $C^2$, the beater B is free to be withdrawn from the churn, to be cleaned or for other purpose, as the case may be.

The beater is constructed of two cross ends, $b^1 b^2$, and between these the board dashers D, so made as to be fastened upon the forward side of the end $b^1$ and after side of the end $b^2$, or vice versa, and appearing as clearly shown at H in Fig. 1. Upon two of the arms of the ends $b^1$ and $b^2$ are the attachable and detachable sieves or perforated dashers E, set away from the dashers D, and made to enter grooves $e^1 e^2$, and held in their respective positions by the hooks $f$.

The object of this construction of the dashers D and wire sieve or perforated plate E is to break the globules, and finally to divide the milk, thereby giving this result, which is to make butter.

There is provided, also, a means of drawing off the milk at M, and this is provided with a sieve, $m$, to prevent the butter from passing off with the milk.

The operation of this simple device is to revolve the dasher rapidly against the milk contained in the churn, using the wire sieve or perforated plate. This operation is continued about one minute, when the wire sieves or perforated plates are removed, and the operation of revolving continued, so as to make butter. The use of the sieves, as before mentioned, is, of course, not required when the butter is to be gathered.

Having thus described my invention, what I claim, and desire to secure by Letters Patent, is—

In a churn, the attachable and detachable wire sieves or perforated plates, in combination with a dasher, D, operating substantially as herein described.

In testimony that I claim the foregoing as my own invention I affix my signature in presence of two witnesses.

JAMES WATSON.

Witnesses:
W. W. LYDDANE,
Y. VON PIKE.